Oct. 25, 1938.                M. G. SHOEMAKER                 2,133,962
                           REFRIGERATING APPARATUS
                            Filed Oct. 30, 1936

WITNESSES:

INVENTOR
MALCOLM G. SHOEMAKER
ATTORNEY

Patented Oct. 25, 1938

2,133,962

UNITED STATES PATENT OFFICE

2,133,962

REFRIGERATING APPARATUS

Malcolm G. Shoemaker, Springfield, Mass., assignor to Westinghouse Electric & Manufacturing Company, East Pittsburgh, Pa., a corporation of Pennsylvania Application October 30, 1936, Serial No. 108,361

7 Claims. (Cl. 62—115)

My invention relates to refrigerating apparatus having a plurality of evaporator elements and has for an object to provide improved apparatus of this kind.

A further object of the invention is to provide an improved multi-evaporator refrigerating system having a high side float valve mechanism common to the evaporators with means for selecting the evaporator to receive refrigerant from the valve mechanism.

Figure 1:
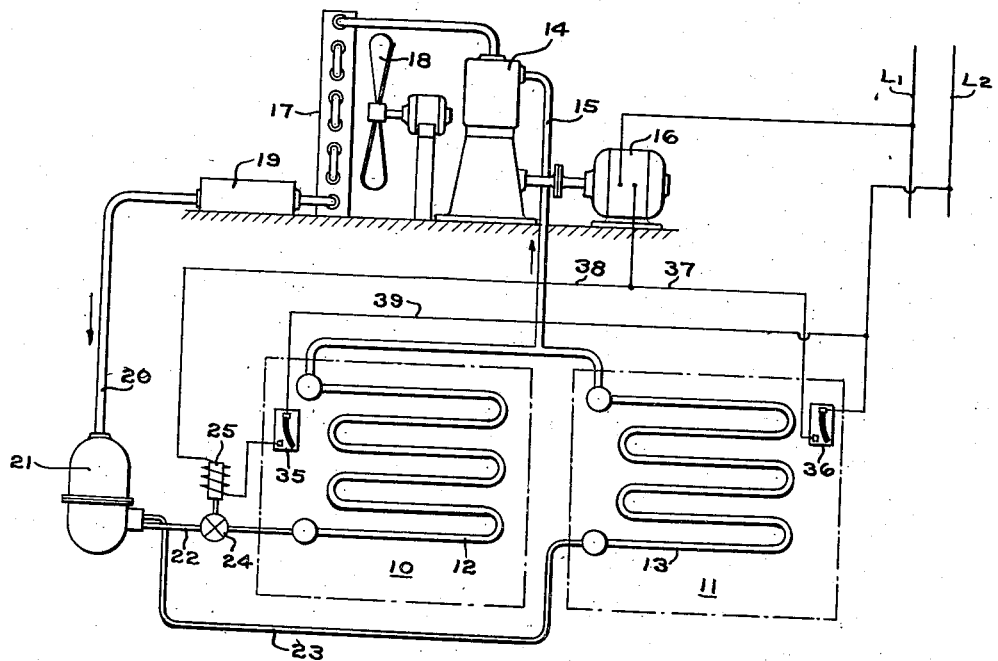
Figure 2:
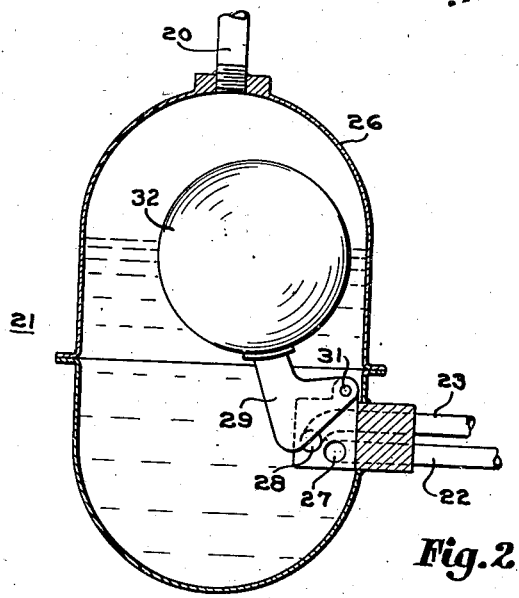

These and other objects are effected by my invention as will be apparent from the following description and claims taken in connection with the accompanying drawing, forming a part of this application in which:

Fig. 1 is a diagrammatic view of a refrigerating system constructed in accordance with my invention; and Fig. 2 is an enlarged sectional view of the float valve employed in the system shown in Fig. 1.

Referring now to the drawing, the numerals 10 and 11 indicate relatively high and low temperature chambers which are refrigerated by evaporators 12 and 13, respectively. Refrigerant vaporized in the evaporators 12 and 13 is withdrawn therefrom by a compressor 14 through a conduit 15 common to both evaporators. The compressor 14 is driven, preferably, by a motor 16 and operates to compress the vapor withdrawn from the evaporators 12 and 13 to a relatively high pressure in a condenser 17. The condenser 17 is cooled in any suitable manner, such as, for example, by a fan 18, whereby the high pressure vapor is condensed. A reservoir 19 may be provided for collecting refrigerant liquefied in the condenser 17.

Condensed refrigerant is conveyed through a conduit 20 from the reservoir 19 to a float valve structure, shown generally at 21, and connected to the evaporators 12 and 13 by conduits 22 and 23. A valve 24 actuated by a solenoid 25 is disposed in the conduit 22 for controlling the flow of refrigerant therethrough. The construction and operation of solenoid operated valves is well known in the art and will not be described, other than to say that the valve 24 is open when the solenoid 25 is energized and is closed when the solenoid 25 is deenergized.

The float valve structure 21 includes a casing 26 that receives condensed refrigerant from the conduit 20. The conduits 22 and 23 terminate in ports 27 and 28 communicating with the interior of the casing 26. A valve plate 29, pivoted at 31, is actuated by a float 32 that rises and falls with the level of liquid refrigerant in the casing 26. The valve plate 29 closes the ports 28 and 27, successively, as the level of the refrigerant in the casing 26 falls.

The position of the float 32 and valve plate 29 shown in the drawing, indicates that the solenoid valve 24 is closed so that liquid cannot pass through the port 27. Accordingly, the float 32 controls the flow of refrigerant passing through the port 28 in response to the level of refrigerant in the casing 26. When the solenoid valve 24 is opened, refrigerant passes immediately through the port 27 and conduit 22 to the evaporator 12. As the level of refrigerant in the casing 26 drops, the valve plate 29 closes the port 28 and controls the flow of refrigerant through the port 27 in response to the level of refrigerant in the casing 26.

The operation of the evaporators 12 and 13 is selectively controlled by the solenoid valve 24. When solenoid 25 is energized, the valve 24 is open and flow of condensed refrigerant to the evaporator 12 is effected under control of the float 32. At this time, the valve plate 29 closes the port 28 so that the conduit 23 and evaporator 13 receive no condensed refrigerant.

Operation of the evaporator 13 is effected by deenergizing the solenoid 25, whereby the valve 24 closes. Flow of refrigerant through the port 27 and conduit 22 to the evaporator 12 is then terminated. Accordingly, the level of refrigerant in the float valve structure 21 rises as the compressor 14 is operated and refrigerant is supplied to the evaporator 13 through the port 28 and conduit 23 in response to the level of refrigerant in the casing 26.

Automatic control of the operation of the evaporators 12 and 13 may be effected by thermostats 35 and 36 that respond to temperatures within the respective chambers 10 and 11 and which control the energization of the motor 16 and solenoid 25. The source of electric power for the motor 16 and solenoid 25 is represented by line conductors $L_1$ and $L_2$.

When closed, the thermostat 36 energizes the motor 16 for operating the compressor 14 whereby refrigerant is supplied to the evaporator 13, the solenoid valve 24 being closed. The energizing circuit includes the line conductor $L_1$, motor 16, a conductor 37, thermostat 36, and line conductor $L_2$. When the thermostat 35 is closed, the motor 16 and solenoid 25 are energized and the compressor operates to circulate refrigerant through the evaporator 12. I have shown the solenoid 25 arranged in series with the motor 16 when the latter is energized by the thermostat 35, but it will be understood that it may be connected otherwise for energization at this time. The energizing circuit for the motor 16 and solenoid 25 includes the line conductor L₁, motor 16, a conductor 38 having the solenoid 25 connected therein, the thermostat 35, a conductor 39, and the line conductor L₂.

The electric connections disclosed give preference to the thermostat 36 when both thermostats 35 and 36 are closed, as the thermostat 36 forms a shunt across the circuit including the conductor 38, solenoid 25, thermostat 35 and conductor 39. Accordingly, the solenoid 25 is deenergized under this condition and refrigerant is, therefore, passed to the low temperature evaporator 13 associated with the thermostat 36. It will be understood that the thermostat 35 and its associated higher temperature evaporator 12 may be given preference, if desired.

*Operation*

As shown in Fig. 1, the temperatures of the air in the chambers 10 and 11 are below values at which their respective thermostats close and, therefore, the motor 16 and compressor 14 are inactive. Assume a rise in temperature in the chamber 10 to the value at which the thermostat 35 closes. The motor 16 and solenoid 25 are energized by the aforementioned circuit so that operation of the compressor 14 and opening of the valve 24 are effected.

Condensed refrigerant in the casing 26 of the valve structure 21 is passed through the port 27 and conduit 22 to the evaporator 12 under control of the float 32. As the valve plate 29 covers the port 28, no condensed refrigerant is passed to the evaporator 13. Operation of the compressor 14 continues until the temperature of the air in the chamber 10 is depressed to the value at which the thermostat 35 opens whereby the compressor 14 is stopped and the solenoid 25 is deenergized. During periods when vaporization is effected in the evaporator 12, the evaporator 13 is filled, substantially, with refrigerant but vaporization is not effected therein as its temperature is lower than the temperature of vaporization in the higher temperature evaporator 12. Vapor from the evaporator 12 is prevented from condensing in the low temperature evaporator 13 as the latter is substantially filled with liquid refrigerant.

Assume a rise in temperature within the low temperature chamber 11 to the value at which the thermostat 36 closes the aforementioned circuit for energizing the motor 16. Operation of the compressor 14 is initiated and withdraws vaporous refrigerant which is present in the evaporators 12 and 13. As the solenoid 25 is deenergized and the valve 24 closed, no condensed refrigerant is passed to the evaporator 12. Condensed refrigerant delivered to the casing 26 raises the float 32 sufficiently to open the port 28 so that refrigerant is delivered to the evaporator 13 through the conduit 23 under control of the float 32. As the evaporator 12 operates at a higher temperature than the evaporator 13, vaporization of the refrigerant therein is effected prior to vaporization of refrigerant in the evaporator 13. When all refrigerant is vaporized in the evaporator 12, evaporation is effected at relatively low pressure in the evaporator 13 and continues until the temperature within the chamber 11 is depressed to a predetermined value at which the thermostat 36 operates to deenergize the motor 16.

Accordingly, when evaporation is effected in the low temperature evaporator 13, the higher temperature evaporator is substantially devoid of liquid refrigerant and when evaporation is effected in the high temperature evaporator 12, the low temperature evaporator is substantially filled with liquid refrigerant. It will be apparent that there is a larger amount of liquid refrigerant in the high side of the system when vaporization is effected in the low temperature evaporator 13 than when vaporization is effected in the high temperature evaporator 12. The added amount of refrigerant in the high side during refrigeration of the low temperature evaporator 13 collects in the float valve casing 26 and effects raising of the float 32 sufficiently to open the port 28. The volume of the casing 26 and the refrigerant charge may be so proportioned that the level of refrigerant in the casing 26 is at proper elevations for the different amounts of refrigerant present in the high side of the system.

When both chambers 10 and 11 require cooling, their respective thermostats 35 and 36 are closed. The low temperature chamber 11 is given preference as the thermostat 36 shunts the thermostats 35 and solenoid 25, as described heretofore. Accordingly, the solenoid 25 is deenergized and the valve 24 is closed, whereby condensed refrigerant is supplied to the evaporator 13 only. When the temperature of the air in chamber 11 is depressed to the desired value, the thermostat 36 opens the shunt across the solenoid 25, which is energized and transfers the flow of refrigerant from the evaporator 13 to the evaporator 12. The compressor 14 continues to operate as the motor 16 is energized by the closed thermostat 35.

From the foregoing, it will be apparent that I have provided an improved two temperature refrigerating system having a novel float valve structure for controlling the flow of refrigerant to the high and low temperature evaporators with means for selecting the evaporator to receive refrigerant.

It will be understood that other forms of refrigerant condensing units may be employed without departing from the spirit of the invention. The various control instrumentalities are shown by way of example and in their simplest form for the sake of clearness and it will be understood that other forms or types of control devices may be employed. The specific construction of the float valve mechanism disclosed may be considered as the preferred form but it is apparent that other forms may be adopted.

While I have shown my invention in but one form, it will be obvious to those skilled in the art that it is not so limited, but is susceptible of various changes and modifications without departing from the spirit thereof, and I desire, therefore, that only such limitations shall be placed thereupon as are imposed by the prior art or as are specifically set forth in the appended claims.

What I claim is:

1. In refrigerating apparatus, the combination of first and second evaporators, means for supplying condensed refrigerant to the evaporators, a valve structure for controlling the supply of condensed refrigerant to the evaporators and including first and second discharge ports for respectively passing refrigerant to the first and second evaporators, means responsive to the level of the liquid in the valve structure for successively opening the first and second ports as the level of refrigerant in the structure rises, and means for controlling the passage of refrigerant through said first port, said controlling means being operative to terminate passage of refrigerant through the first port, whereby the level responsive means operates to control the discharge of refrigerant through the second port to the second evaporator.

2. In refrigerating apparatus, the combination of first and second evaporators, means for condensing refrigerant vaporized in the evaporators, a container for receiving the condensed refrigerant and having first and second outlets connected to the first and second evaporators, respectively, a valve cooperating with the outlets and movable in response to the level of liquid in the container, said valve opening the first and second outlets successively as the level in the container rises, and means for controlling the passage of refrigerant through the first outlet and movable to a position wherein the passage of refrigerant through the first outlet is prevented, whereby the valve cooperates with the second outlet to supply refrigerant to the second evaporator.

3. In refrigerating apparatus, the combination of first and second evaporators, means for condensing refrigerant vaporized in the evaporators, a container for receiving the condensed refrigerant and having first and second outlets connected to the first and second evaporators, respectively, a float positioned in response to the level of liquid in the container, a movable valve member associated with the outlets and actuated by the float in such manner that the flow of refrigerant through the first port is controlled thereby while the second port is closed, and means for controlling the passage of refrigerant through the first port and adjustable for preventing the passage of refrigerant therethrough, whereby the level of liquid in the container rises and the valve member cooperates with the second port for controlling the flow of refrigerant therethrough.

4. In refrigerating apparatus, the combination of first and second evaporators, means for condensing refrigerant vaporized in the evaporators, a float valve structure for receiving the refrigerant condensed by said condensing means, said float structure having first and second outlets for passing refrigerant to the first and second evaporators, respectively, and means for selecting the outlet of the float structure which is effective to pass refrigerant.

5. In refrigerating apparatus, the combination of first and second evaporators, means for condensing refrigerant vaporized in the evaporators, a float valve structure for receiving the refrigerant condensed by said means, said float structure having first and second outlets for passing refrigerant to the first and second evaporators, respectively, and means responsive to temperatures produced by the respective evaporators for selecting the outlet which is effective to pass refrigerant.

6. In refrigerating apparatus, the combination of first and second evaporators, a compressor for circulating refrigerant through the evaporators, and means including first and second passages connected to the respective evaporators for controlling the flow of refrigerant through the evaporators, said means being responsive to a condition of the refrigerant for selectively effecting flow of refrigerant in the evaporators.

7. In refrigerating apparatus, the combination of first and second evaporators, a refrigerant condensing unit for circulating refrigerant through the evaporators, and means including first and second refrigerant passages respectively connected to the first and second evaporators for selectively controlling the flow of refrigerant to the evaporators, said means being actuated in response to variable levels of refrigerant condensed by said condensing unit.

MALCOLM G. SHOEMAKER.